Aug. 4, 1959   C. J. DAVIS   2,897,986
MECHANICAL SHOVEL APPARATUS FOR TRANSPORT VEHICLES
Filed April 25, 1957   3 Sheets-Sheet 1

CHARLES J. DAVIS
INVENTOR.

BY Hubert Miller
ATTORNEY

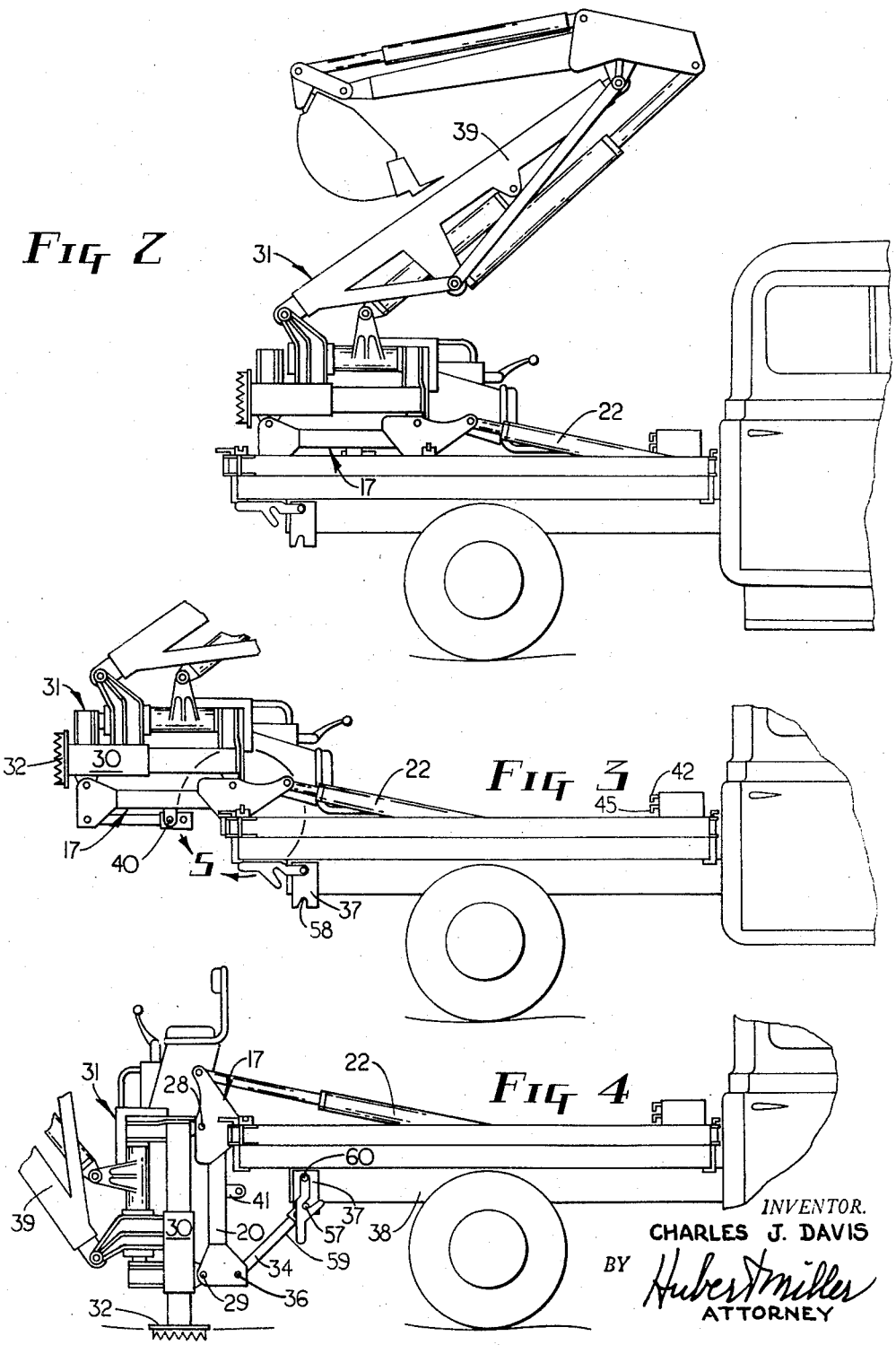

Aug. 4, 1959
C. J. DAVIS
2,897,986
MECHANICAL SHOVEL APPARATUS FOR TRANSPORT VEHICLES
Filed April 25, 1957
3 Sheets-Sheet 3
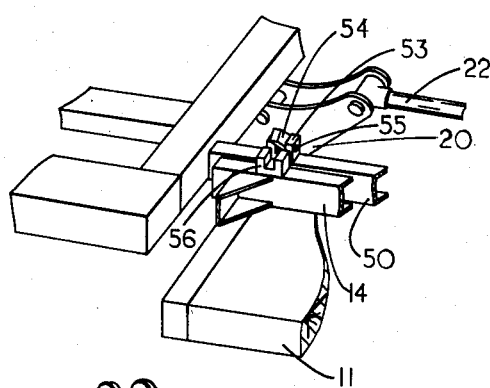
FIG 5
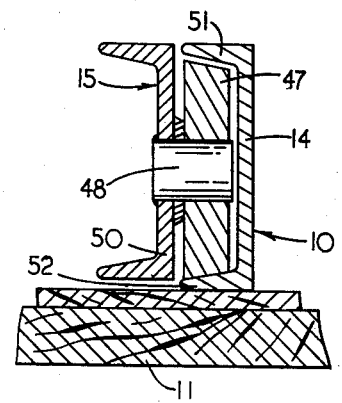
FIG 6
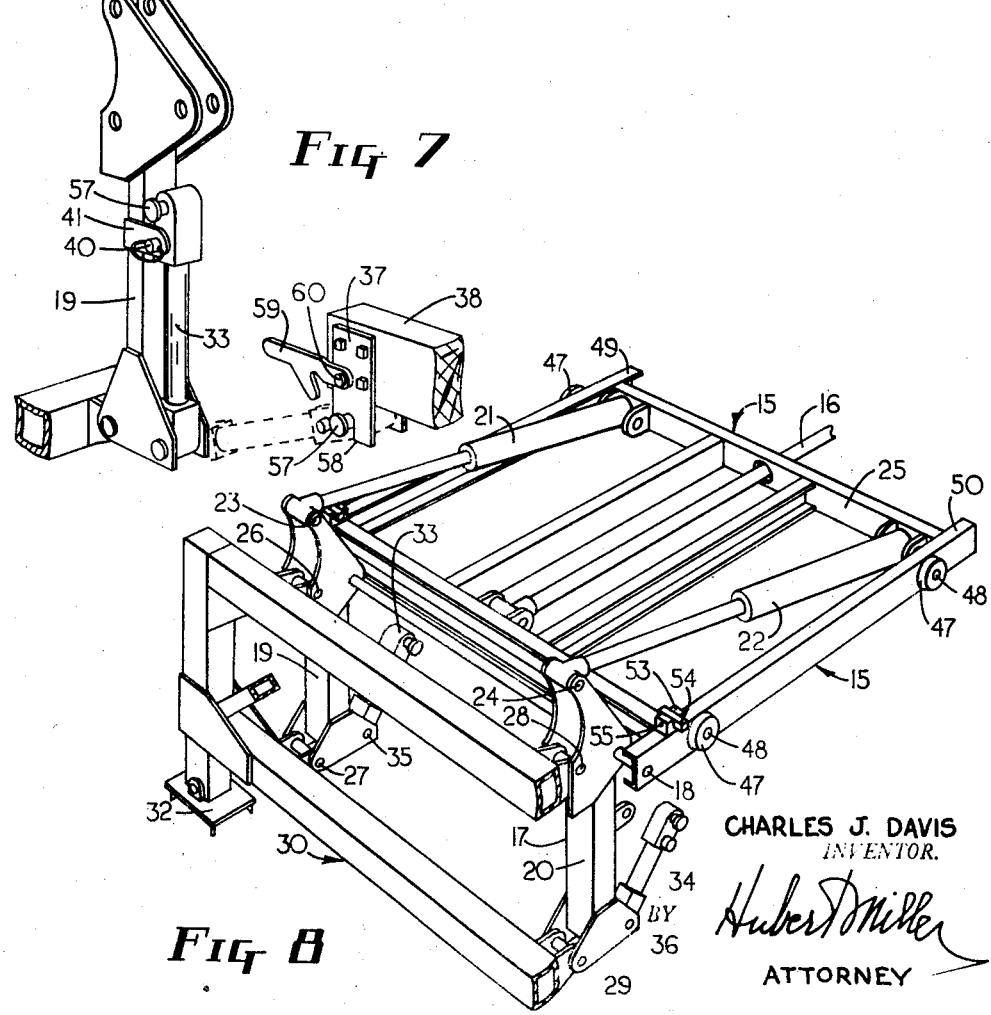
FIG 7
FIG 8
CHARLES J. DAVIS
INVENTOR.
BY Hubert Miller
ATTORNEY

United States Patent Office 2,897,986
Patented Aug. 4, 1959

2,897,986
MECHANICAL SHOVEL APPARATUS FOR TRANSPORT VEHICLES

Charles J. Davis, Wichita, Kans., assignor, by mesne assignments, to Massey-Ferguson Inc., a corporation of Maryland Application April 25, 1957, Serial No. 655,134

10 Claims. (Cl. 214—131)

Heretofore it has been a well-known practice to mount light duty mechanical shovels on farm type tractors. A farm tractor usually constitutes a reasonably good shovel supporting unit from which the shovel may perform its work, but when it becomes necessary to move the shovel to a distant location, the tractor provides a very poor transport vehicle. In fact, in most instances, it is necessary to detach the shovel from the tractor, hoist the shovel onto a truck, and haul the shovel to its next point of use. If the same tractor is to be used with the shovel at the next point of use, then the tractor must also be driven or hauled to the new location.

It is the general object of this invention to overcome these and other disadvantages experienced with tractor mounted mechanical shovels by providing apparatus for mounting a mechanical shovel on the bed of a truck which will provide a sturdy support for the mechanical shovel when in the working position, and will also provide a better means for transporting the mechanical shovel from location to location.

More specifically, it is an object of this invention to provide a means for movably mounting the mechanical shovel on the truck bed such that the shovel will be firmly supported in a desired working position with relation to the ground, and may be moved to a new position on the truck bed in which it can be transported by the truck to a new location, and quickly again moved into working position at the new work site.

A more specific object of the invention is to provide shovel mounting apparatus which is power operated to move the shovel between a ground working position and a stowed transport position.

Another object is to provide apparatus which serves to hold the shovel frame in a substantially fixed position during ground work by the shovel, while permitting the weight of the shovel to be supported by the ground rather than by the truck.

Still another object is to provide apparatus of the type mentioned which can be easily attached to or removed from a truck bed, and to which mechanical shovels of varying mechanical design can be connected or readily disconnected.

The invention together with other objects will be more clearly understood when the following description is read with reference to the accompanying drawings, in which:

Fig. 2 is a side elevational view of the apparatus with the mechanical shovel in a position to be transported by the truck;

Figs. 3 and 4 are side elevational views of the apparatus mounted on a truck bed and supporting a mechanical shovel, shown fragmentarily, Fig. 3 showing the shovel moved to an intermediate position between the stowed position of Fig. 2 and the ground working position of Fig. 4;

Fig. 5 is a fragmentary isometric view illustrating a preferred form of lock for the cradle carriage;

Fig. 6 is a sectional view of a portion of the apparatus and is taken along the line 6—6 of Fig. 1;

Fig. 7 is a fragmentary view of a portion of the apparatus illustrating a preferred means for bracing the cradle while the shovel is being supported in ground working position; and Fig. 8 is an isometric view showing only the cradle and the cradle carriage assembled together, and the manner in which the frame of the mechanical shovel is connected to the tiltable cradle.

General Description

Figure 1:
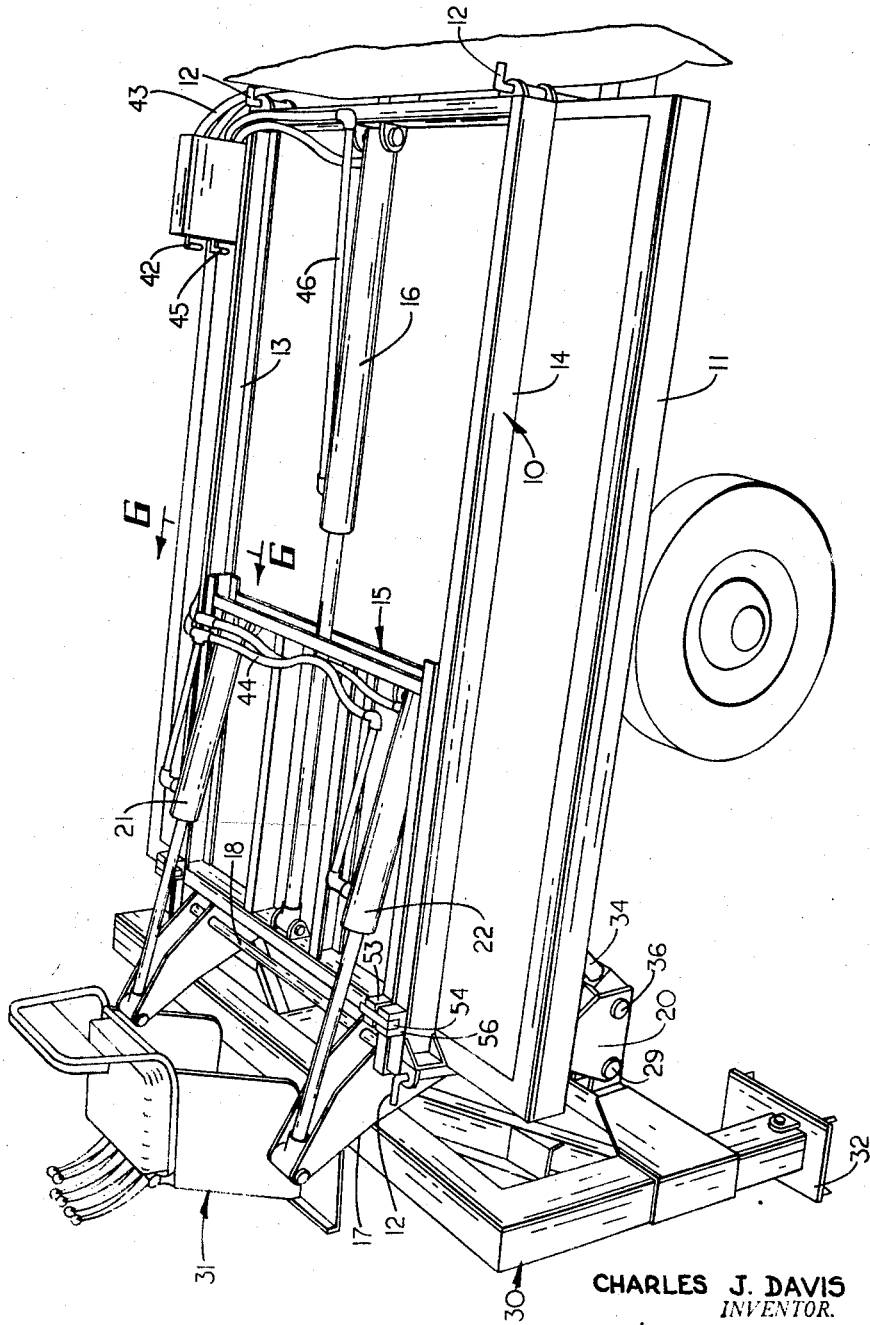
Fig. 1 is a perspective view illustrating apparatus embodying the invention mounted on a truck bed and supporting a mechanical shovel in ground working position, the truck and the mechanical shovel being shown only fragmentarily.

For exemplary purposes the invention is shown incorporated in a mechanical shovel which, according to the invention, is movably carried by means such as a rigid frame 10 (Fig. 1) longitudinally disposed and removably anchored flat on a truck bed 11 by means of anchor bolts 12, one near each corner of the frame. Power means supported by the bed is also provided to move the mechanical shovel from a working position adjacent the edge of the bed to a transport position over the bed. For supporting the mechanical shovel, the frame 10 includes two parallel channel section slideways or rails 13 and 14 between which a cradle carriage 15 is movable longitudinally by the power means which, in this case, includes a double acting working cylinder 16. A cradle 17 (Fig. 8) is rockably mounted at the aft end of carriage 15 on a transverse pivot axis 18 and provides means for supporting the mechanical shovel. The cradle includes laterally spaced parallel rigid substantially identical side members 19 and 20 and the transverse pivot axis 18 is located intermediate the respective ends of these side members so that their upper ends (Fig. 8) serve as bell cranks for rocking the cradle about its axis. A pair of coacting double acting working cylinders 21 and 22 have their ends pivotally connected at 23 and 24 to the respective upper ends of cradle side members 19 and 20, the opposite ends of the cylinders being pivotally connected to the forward cross member 25 of the carriage 15.

Spaced apertures are provided in each cradle side member 19 and 20 to receive and anchor pins 26, 27, 28 and 29 (Fig. 8) which serve to connect the rigid frame 30 of a mechanical shovel to the cradle of the mounting apparatus. The mechanical shovel is designated as a whole by the numeral 31 (Fig. 2).

Operation

Referring to Figs. 1 and 4, the components of the apparatus have been moved to locate the shovel 31 in an upright ground working position, with its supporting feet 32 supported on the ground. A pair of rigid braces 33 and 34 (Fig. 8) extend between transverse pivot pins 35 and 36 near the respective lower ends of the two cradle side members 19 and 20 to fixed anchor brackets 37 (Fig. 4) secured to the aft end of the truck frame 38.

Thus the cradle 17 of the described apparatus, with assistance from the truck, serves to hold the shovel frame 30 in a substantially vertical plane, even during the lifting of heavy loads by the boom 39 of the shovel.

When shovel work at one site is complete and it is desired to move the shovel to another site, the respective upper ends of braces 33 and 34 are disconnected from brackets 37 and the braces are swung to positions alongside their respective side members 19 and 20, as clearly shown in Figs. 3 and 7. The braces are held in such positions by removable pins 40 passing through apertures in brackets 41 (Fig. 7) and through registering apertures in the braces.

Valve actuator 42 (Fig. 1) is next manipulated and hydraulic pressure fluid flows from the truck engine driven hydraulic pump (not shown) through supply line 43 (Fig. 1) through header line 44 to the respective aft ends of cradle rocking cylinders 21 and 22. These cylinders then rock the cradle 17, together with the cradle attached mechanical shovel 31, into the position shown in Fig. 3 about the cradle pivot axis 18. The bottoming of the respective plungers in cylinders 22 and 21 stops the cradle in the Fig. 3 position.

Valve actuator 45 is next manipulated and pressure fluid enters the aft end of carriage moving cylinder 16 through line 46. Cylinder 16 then moves carriage 15 forward along the rails 13 and 14, and the carriage supported cradle 17 and the mechanical shovel 31 are moved to the position shown in Fig. 2, in which position the shovel may be transported by the truck to a new working site.

The shovel may be again moved to the working position shown in Fig. 4 by reversing the procedure just described.

*Structural details*

As a means of movably mounting carriage 15 in the rigid frame 10 the carriage is fitted near each of its four corners with identical rollers 47 (Figs. 6 and 8) journaled respectively on pins 48 which are welded or otherwise rigidly secured in the webs of the opposite channel section side members 49 and 50 as clearly shown in Fig. 6. When frame 10 and carriage 15 are in assembled relationship the rollers are positioned between the upper and lower flanges 51 and 52 of the respective frame side members 13 and 14. The carriage is thereby retained against any appreciable movement except longitudinal movement with relation to the frame.

As a means of locking the carriage 15 at the aft end of its path of longitudinal travel, a gravity closed cradle opened lock is provided at each side of the carriage (Figs. 5 and 8). A hinge block 53 is welded atop each carriage side member 49 and 50 near their aft ends. A lock bolt 54 is pivotally mounted intermediate its ends at 55 in the block 53. One end of bolt 54 projects inward into the path of travel of the upper end of the adjacent cradle side member 20, so that as the cradle is pivoted toward the position shown in Fig. 3 the upper end of each cradle side member contacts a respective one of the lock bolts 54 and moves it to the position shown in Fig. 5. When the cradle 17 is moved to the position shown in Figs. 1, 4 and 8, each lock bolt is moved by gravity to seat in a bifurcated bolt receiver 56 (Fig. 1) welded atop each side member 13 and 14 of the frame, thus firmly locking the carriage 15 against movement with relation to frame 10.

The cradle braces 33 and 34 each includes an outwardly projecting pin 57 (Fig. 7) which seats in an open notch 58 in bracket 37 when the brace is moved to the position shown in Fig. 4. A generally hook shaped lock member 59 is pivotally mounted at 60 on bracket 37, and can be swung into the position shown in Fig. 4 to anchor pin 57 in notch 58, and to thus hold the entire upper end of the brace in fixed position and anchored to the truck bed.

Having described the invention with sufficient clarity to enable those familiar with this art to construct and use it, I claim:

1. In an apparatus for mounting a power shovel on the bed of a vehicle, the combination comprising, a carriage supported on the bed, a frame supported by the vehicle bed including a pair of spaced parallel rails straddling the carriage and supporting the same for movement along the rails toward and from a working position adjacent the edge of the bed, said power shovel including a frame, a cradle pivotally connected to the carriage for vertical movement and carrying the power shovel frame, power means supported by the carriage and connected to the cradle for moving the latter between a raised position wherein the power shovel frame is carried above the bed and a lower position wherein the power shovel frame is carried adjacent the edge of the bed, said power shovel frame having a foot which is engageable with the ground in the lower position of the cradle, bracing means for interconnecting said vehicle bed and the power shovel frame, said foot and said bracing means serving to brace the power shovel frame while the power shovel is operated, and power means supported by the bed and connected to the carriage for moving the carriage along the rails between said working position and a transport position spaced from the edge of the vehicle bed and in which latter position the power shovel is carried over the vehicle bed.

2. In an apparatus for mounting a power shovel on the bed of a transport vehicle, the combination comprising, a carriage movably mounted on the bed of the vehicle for movement toward and away from a working position at the edge of the vehicle bed, said power shovel including a frame, a cradle pivotally connected to the carriage for vertical movement and carrying the power shovel frame, power means supported by the carriage and connected to the cradle for pivoting the latter between a raised position wherein the power shovel frame is carried above the vehicle bed and a lower position wherein the power shovel frame is located adjacent the edge of the vehicle bed, a foot member supported by the power shovel frame so as to be engageable with the ground in the lower position of the cradle, bracing means supported by said power shovel frame and connectible to said vehicle bed so as to brace the power shovel frame against the vehicle while the power shovel is operated, and power means connected to said vehicle bed and said carriage for moving the latter between said working position and a transport position while the cradle is in its raised position, so as to move the power shovel to a transport position over the vehicle bed.

3. In an apparatus for mounting a power shovel on the bed of a transport vehicle, the combination comprising, a pair of spaced parallel rails anchored on the vehicle bed and extending lengthwise thereof, a carriage movable on said rails toward and from a working position at the edge of the bed, a latch bar pivotally carried by the carriage, a cooperating latch member defining a slot for receiving the latch bar so located on one of the rails as to lock the carriage rigidly against movement at the working position, said power shovel including a frame, a cradle for supporting the power shovel frame, means carried by the carriage and supporting the cradle for pivotal movement while the carriage is at the working position between a raised position wherein the power shovel frame is carried above the bed and a lower position wherein the power shovel frame is located adjacent the edge of the bed, said power shovel frame having a member which engages the ground in the lower position of the cradle so as to brace the shovel frame while the power shovel is operated, and power means supported by the vehicle bed and connected to the carriage for moving the latter along the rails between the working position and a transport position wherein the power shovel is carried over the vehicle bed.

4. In an apparatus for mounting a power shovel on the bed of a transport vehicle, the combination comprising, a carriage movably mounted on the bed of the vehicle for movement toward and from a working position at the after end of the vehicle, said power shovel including a frame, a cradle for supporting the power shovel frame, means carried by the carriage for pivotally mounting the cradle for movement between a raised position wherein the power shovel frame is carried above the vehicle bed, and a lower position wherein the power shovel frame is carried adjacent the after end of the vehicle bed, a foot member supported by the power shovel frame for engagement with the ground in the lower position of the cradle, and bracing means supported by said power shovel frame and connectible to said vehicle bed, said foot member and bracing means serving to brace the power shovel frame while the power shovel is operated.

5. In an apparatus for mounting a power shovel on the bed of a transport vehicle, the combination comprising, a pair of spaced parallel rails anchored on the vehicle bed and extending lengthwise thereof, a carriage having rollers for support by said rails and movably mounting the carriage for movement toward and from a working position at the tail end of the vehicle bed, said power shovel including a frame, a cradle carrying the power shovel frame on the carriage including a pair of spaced bell crank levers pivotally connected intermediate their ends to said carriage for vertical pivotal movement, said levers being connected at one end to said power shovel frame, spaced power means supported by the carriage and connected to the other ends of said levers, respectively, for pivoting the same between a raised position wherein the power shovel frame is carried above the vehicle bed and a lower position wherein the power shovel frame is adjacent the bed of the vehicle, a foot member supported by the power shovel frame for engagement with the ground in the lower position of the cradle, bracing means supported by said power shovel frame and connectible with said vehicle bed, said foot member and bracing means serving to brace the power shovel frame while the power shovel is operated, and power means supported by the vehicle bed and connected to the carriage for moving the latter along the rails between the working position and a transport position wherein the power shovel is carried over the vehicle bed.

6. In an apparatus for mounting a power shovel on the bed of a vehicle, the combination comprising, a frame supported by the vehicle bed including a pair of spaced parallel inwardly opening channel section rails having their respective outer ends extending to an edge of said bed; a carriage mounted for movement along the rails and supported between the latter, having rollers extending into said channel sections for rolling support by the edges of the same; said power shovel including a frame; a cradle pivotally connected to the carriage for vertical movement and carrying the power shovel frame, said cradle being movable vertically between one position wherein the power shovel frame is carried above the vehicle bed and a lower position wherein the power shovel frame is carried adjacent the edge of the bed; a member supported by the power shovel frame so as to be engageable with the ground in the lower position of the cradle; bracing means for interconnecting said vehicle bed and the power shovel frame, said member and bracing means serving to brace the power shovel frame while the power shovel is operated; and power means supported by the bed and connected to the carriage for rolling the carriage along the rails between said working position and a transport position spaced from the edge of the vehicle bed and in which latter position the power shovel is carried over the vehicle bed.

7. In an apparatus for mounting a power shovel on the bed of a transport vehicle, the combination comprising, a pair of spaced parallel rails anchored on the vehicle bed and extending lengthwise thereof, a carriage movable on said rails toward and from a working position at the edge of the bed, latch means supported by the carriage and engageable with a cooperating member on the rails for locking the carriage rigidly against movement at the working position, said power shovel including a frame, a cradle for supporting the power shovel frame, means carried by the carriage and supporting the cradle for pivotal movement while the carriage is at the working position between a raised position wherein the power shovel frame is carried above the bed and a lower position wherein the power shovel frame is located adjacent the edge of the bed, said power shovel frame having a member which engages the ground in the lower position of the cradle so as to brace the power shovel frame while the power shovel is operated, and power means supported by the vehicle bed and connected to the carriage for moving the latter along the rails between the working position and a transport position wherein the power shovel is carried over the vehicle bed.

8. In an apparatus for mounting a power shovel on the bed of a vehicle, the combination comprising, a carriage movably mounted on the bed of the vehicle for movement toward and from a working position at the edge of the vehicle bed, said power shovel including a frame, a cradle for carrying the power shovel frame on the carriage including a pair of spaced levers pivotally connected intermediate their ends to said carriage for vertical pivotal movement, said levers being connected at one end to said power shovel frame, spaced power means supported by the carriage and connected to the other ends of said levers, respectively, for pivoting them between a raised position wherein the power shovel frame is above the vehicle bed, and a lower position wherein the power shovel frame is adjacent the edge of the vehicle bed, a foot member supported by said power shovel frame so as to be engageable with the ground in the lower position of the levers, bracing means connectable between the under side of said vehicle bed and the power shovel frame, said foot member and bracing means serving to brace the power shovel frame while the power shovel is operated, and power means supported by the vehicle bed and connected to the carriage for moving the same between said working position and a transport position spaced from the edge of the bed.

9. In an apparatus for mounting a power shovel on the bed of a transport vehicle, the combination comprising, a pair of spaced parallel rails anchored on the vehicle bed and extending lengthwise thereof, a carriage movable on said rails from a working position at the edge of the bed to a transport position spaced therefrom, said power shovel including a frame, a cradle for supporting the power shovel frame, means carried by the carriage and supporting the cradle for pivotal movement while the carriage is at the working position between a raised position wherein the power shovel frame is carried to clear the bed and a lower position wherein the power shovel frame is located adjacent the edge of the bed, said power shovel frame having a member which engages the ground in the lower position of the cradle so as to brace the power shovel frame while the power shovel is operated, a latch bar pivotally carried by the carriage, a cooperating latch member mounted on one of the rails to receive the latch bar and so located as to receive the latch bar for locking the carriage rigidly against movement at the working position, and means for pivoting said latch bar so as to release the same as an incident to raising of the cradle from the lower position to the position where it clears the vehicle bed, so as to unlock the carriage for movement to the transport position.

10. In an apparatus for mounting a power shovel on the bed of a transport vehicle, the combination comprising, spaced rails mounted on the vehicle bed, a carriage movably mounted on the rails for movement between a working position at the edge of the bed of the vehicle and a transport position spaced therefrom, said power shovel including a frame, a cradle carrying the power shovel frame on the carriage including members pivotally connected to the carriage for vertical pivotal movement, power means supported by the carriage and connected to the members for pivoting the same between a raised position wherein the power shovel frame is carried above the vehicle bed, and a lower position wherein the power shovel frame is carried adjacent the edge of the vehicle bed, and a foot member supported by the power shovel frame for engagement in the ground in the lower position of the cradle, so as to brace the power shovel frame while the power shovel is operated.

References Cited in the file of this patent

UNITED STATES PATENTS

| | | |
|---|---|---|
| 2,595,864 | Lowry | May 6, 1952 |
| 2,708,047 | Seidle | May 10, 1955 |
| 2,781,927 | Holopainen | Feb. 19, 1957 |

FOREIGN PATENTS

| | | |
|---|---|---|
| 50,283 | France | Jan. 9, 1940 |
| 737,682 | Great Britain | Sept. 28, 1955 |